United States Patent [19]

Anderson

[11] 4,305,554

[45] Dec. 15, 1981

[54] BELT REEL

[75] Inventor: Alexander B. Anderson, Carlisle, England

[73] Assignee: Kangol Magnet Limited, Carlisle, England

[21] Appl. No.: 130,236

[22] Filed: Mar. 14, 1980

[51] Int. Cl.³ .................... A62B 35/02; B65H 75/48
[52] U.S. Cl. .............................. 242/107.4 A; 242/74
[58] Field of Search ............... 242/107.4 R–107.4 E, 242/74; 280/802–808; 297/474–480

[56] References Cited

U.S. PATENT DOCUMENTS 3,202,379 8/1965 Wrighton et al. ............ 242/107.4 B
4,008,863 2/1977 Fohl ............................. 242/107.4 B

*Primary Examiner*—John M. Jillions

*Attorney, Agent, or Firm*—Young & Thompson

[57] ABSTRACT

A vehicle seat belt retractor has a spool fitted around the shaft of the reel, the spool having a slot formed at a radial step through which the belt extends from a securement to the shaft. The outer surface of the spool otherwise comprises two or three part circular cylindrical portions which smoothly merge. The step approximates to the thickness of the belt so a smooth spiral configuration is obtained for the coiled belt but only cylindrical surfaces, and not a spiral surface, have to be produced, with manufacturing advantages. The spool can be of a size to accommodate any doubled portion of the belt required to form a securement loop. The spool increases the effective diameter of the reel and so reduces spring tension on the belt in use.

5 Claims, 5 Drawing Figures

BELT REEL

BACKGROUND OF THE INVENTION

The invention relates to a reel of the kind in which a belt, for example a vehicle seat belt, can be wound, and from which the belt may be unwound for use.

It is desirable that the belt be coiled on a shaft of the reel in a regular spiral configuration, without radial protrusions, so that winding and unwinding are smooth, continuous operations. This is made difficult by the need to secure one end of the belt to the shaft, as the securement means tends to produce a hump at at least one position around the shaft. If the belt end is secured within the interior of a hollow shaft of circular cross-section, the belt extending outwardly of a slot in the shaft wall, the belt still cannot be smoothly coiled on the shaft because of the discontinuity at the position at which the belt emerges from the slot.

In U.S. Pat. No. 4,008,863, issued on Feb. 22, 1977 to Arthur Föhl, a solution to this problem is proposed according to which a belt winding-up roller system has a winding-up shaft means with an outer contour in the path of an Archimedes spiral having a pitch corresponding to the thickness of the belt, the belt being wound on the shaft means starting at the point of smallest radius and proceeding about the spiral surface to the point of greatest radius, the contacting surface of the belt with the shaft means and with itself lying in the path of the Archimedes spiral.

This solution provides for the desired smooth rolling up and unrolling of the belt but is accompanied by serious manufacturing difficulties. These arise from the specified external shape of the shaft means, the attainment of which requires the use of expensive specialized machinery. If the external shape of the shaft means is provided by a moulded plastics sleeve, this difficulty applies to the preparation of the mould. The mould may be produced by spark erosion techniques and this requires an electrode to be produced in the shape of the sleeve to be moulded, so this electrode cannot be produced by conventional means and is consequently unduly expensive.

It is accordingly an object of the invention to provide a belt reel with a support surface on and from which a belt can be smoothly wound and unwound, which can be economically produced.

It is also an object of the invention to provide a belt reel with a shaft on and from which a belt can be smoothly wound and unwound, the shape of the shaft outer surface being geometrically simple.

SUMMARY OF THE INVENTION

The invention accordingly provides a belt reel with a shaft having an outer surface comprising surface portions of simple geometrical form. Although a rather large number of flat surface portions could be used the surface preferably comprises two or three or other finite number of curved cylindrical portions, conveniently part circular cylindrical portions of different radii, merging together except at the position of the boundary between the portions with the largest and smallest radii, from which position the belt extends.

With two part circular cylindrical portions having radii which differ by about half the thickness of the belt, the parallel axes of the portions are spaced apart by the difference in radii in a plane intersecting the step at which the belt is secured so that the surfaces of the portions blend smoothly together where they cut the plane on the other side of the axes from the step. However, three or four or more such part circular cylindrical portions can be employed.

Existing reels in vehicle seat belt retractors frequently have the disadvantage of requiring considerable spring torque from the rewind spring which acts on the reel to tend to wind in the belt. The resulting tension in the belt in use tends to cause a certain amount of discomfort to the user, and in some instances the belt is withdrawn into the reel at an inconveniently high rate.

The shaft of the invention can consequently have its outer surface provided by a spool member which can surround a conventional spindle assembly. The spool member will have a slot at the step portion of the outer surface through which the belt extends, and can be an integral or an add-on part of the retractor reel.

There is then a reduction in the tension in the belt in use, resulting from the increase in the effective diameter of the reel. This advantage derives from the relationship whereby the tension equals the torque divided by the radius, so an increase in the radius for a given spring torque reduces the tension.

The belt end is conveniently secured by being doubled over and connected to itself to form an end loop, the connection being by a stitch pattern extending lengthwise of the belt for say 3 or 4 cm. The spool member can be adapted to accommodate this length within it as a part turn or a turn or more, of the belt around internal the shaft or spindle assembly. The doubled over belt length is preferably snugly received in the spool member to resist any tendency for it to escape through the slot, but to ensure that no such escape can occur, the spool member can be prevented from rotating relative to the shaft or spindle assembly. Thus, the spool member can be non-rotatably secured to a flange fixed to the shaft by a projection on one received in a recess in the other.

The invention thus provides for the avoidance of discontinuities in the spiral configuration of a belt wound on a reel of the invention, without the use of members of complex shape, which are expensive to produce.

Figure 1:
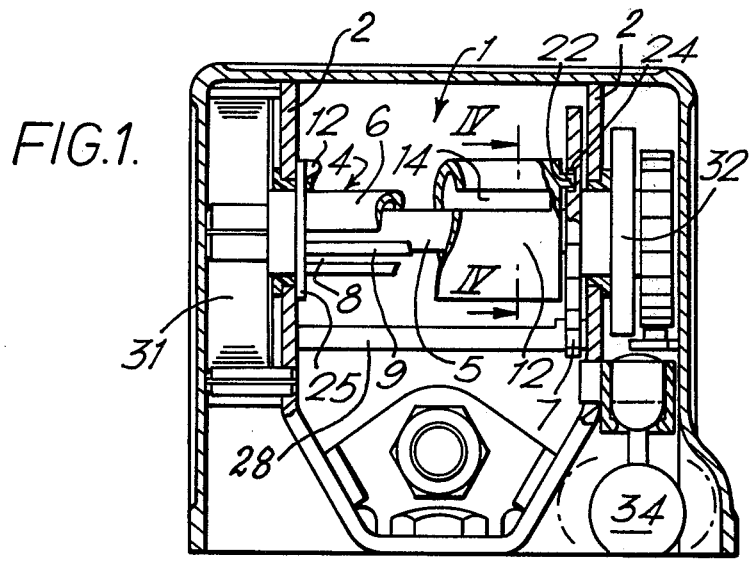
FIG. 1 is a part sectional elevation with parts broken away of a vehicle seat belt retractor including a reel embodying the invention.

The retractor illustrated in FIG. 1 has a frame 1 with parallel side webs 2 extending from a centre web, and journalling a reel having a spindle assembly 4, conveniently made of metal, comprising a shaft 5 and a sleeve 6 concentric with the shaft. A flange 7 is affixed to the sleeve 6 adjacent one of the side webs 2 and has ratchet teeth around its periphery. The sleeve 6 has a longitudinal slot 8 along which extends a locking pin 9. These elements of the spindle assembly are connected to rotate together in bearings in the side webs 2. Around the sleeve 6 extends a spool 12, which can conveniently be moulded of plastics material, having the form of a cylindrical shell with a longitudinal slot 14. The external periphery 15 of the spool 12 when seen along the axis (FIG. 2) has two portions of different radii $R_1$, $R_2$ centred respectively on points $C_1$, $C_2$ spaced apart by the difference between the radii, that is, by $R_1-R_2$. Along a line B on the periphery where this is cut by a plane joining the centre points, the portions of different radii join smoothly together and at the opposed position of intersection there is a generally radially extending step 18 of depth $2\times(R_1-R_2)$. The slot 14 is formed at the discontinuity in the shell wall of the spool at the step 18. To provide necessary rigidity a narrow bar 19 constitutes a continuation of the wall at each end of the slot.

Figure 2:
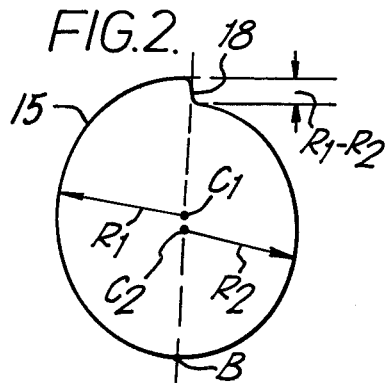
FIG. 2 is a diagrammatic cross-section showing the external shape of the spindle assembly of the reel.
Figure 3:
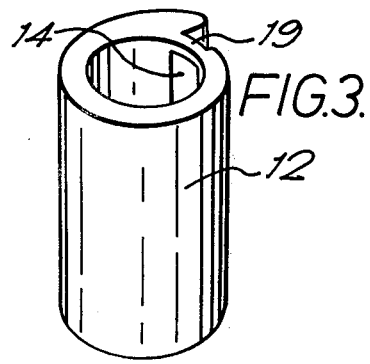
FIG. 3 is a perspective view of a spool member included in the reel.
Figure 5:
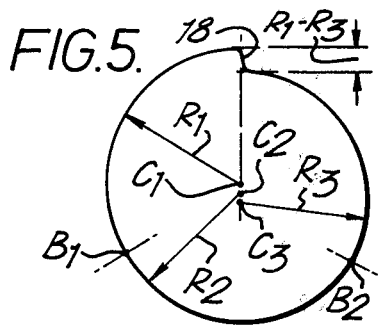
FIG. 5 is a diagrammatic cross-section showing the external shape of a modified spindle assembly in accordance with the invention.

Instead of the two portions of FIG. 2, the spool may have three such portions as shown in FIG. 5, or more. The greater the number of such portions, the closer the outer surface of the spool is to a true spiral configuration and although a greater number of such surfaces has to be produced, each is part of a circular cylinder and can consequently be manufactured in a simple and economic way.

As shown in FIG. 5, the outer surface of a modified spool member comprises three portions of radii $R_1>R_2>R_3$. The portion of diameter $R_2$ is centred at point $C_2$ and smoothly joins the portions of diameter $R_1$, $R_3$, which are centred respectively at points $C_2$, $C_3$, along lines $B_1$, $B_2$. The portions with radii $R_1$, $R_3$ are separated by a step of depth $2\times(R_1-R_3)$, at which the slot 18 is formed.

Figure 4:
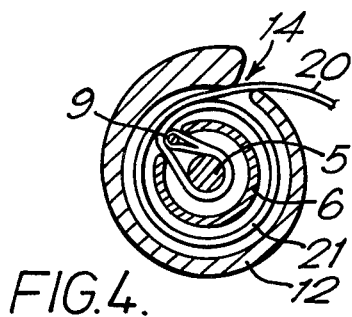
FIG. 4 is a partial cross-sectional view on the line IV—IV of FIG. 1.

As will be seen from FIG. 4, the spool interior is defined by a generally circular cylindrical inner surface and is of sufficient size to accommodate rather more than a full turn of a webbing belt 20, as well as the spindle assembly, to which an end of the belt is connected. Connection is effected by a loop formed by a doubled over end portion of the belt 20 which is secured by an extended stitch pattern 21. The end of the loop remote from the stitch pattern is at the locking pin 9 and the doubled length extends from the pin around the shaft 5 and then outwardly through the slot 8 between the pin and one edge of the sleeve 6. The doubled length is wound around the sleeve 6 within the spool member 12 for rather more than a whole turn before emerging through the slot 14 in the spool member. The doubled portion with the stitch pattern 21 is wholly accommodated within the spool member so that only a single thickness of the belt emerges from the slot 4.

The radial extent of the step 18 corresponds at least approximately to the thickness of the belt webbing so this can be coiled around the spool member 12 in a smooth helical configuration, substantially without any distortions due to the connection of the belt to the reel. It is to be noted that the drawings and FIG. 4 in particular are schematic only; the belt 20 in FIG. 4 is shown as being very much thinner than it would actually be for the sake of clarity. In practice the belt is a tight fit within the spool member to prevent escape therefrom of the doubled over belt portion.

It is however preferred positively to lock the spool member to the reel and this is done in the retractor illustrated by interfitting formations on the spool member and the toothed flange 7. As appears from FIG. 1, the spool member 12 is provided with a longitudinally extending pin 22 received in a correspondingly shaped recess 24 in the adjacent face of the flange 7. When the reel is being assembled, the spool member is placed over the spindle assembly and turned relative to it to wind in the doubled over length of the belt with the stitch pattern 21, the positions of the pin 22 and recess 24 being selected so that the pin enters the recess due to the resilience of the spool member, when enough of the belt has been wound on the sleeve 6.

At one side, the frame 1 supports a rewind or retractor spring 31 which tends to turn the spindle assembly, in a direction to wind thereon the belt 20 which extend from the retractor to a buckle or through the buckle to an anchorage to form a two point or a three point seat belt configuration respectively. Because of the relative increase in diameter due to the presence of the spool member 12, the spring 31 exerts a reduced tension on the belt 12 in use.

The spool member 12 can be closed at the end remote from the flange 7 by a disc 25 and if desired this disc can be fixed to the sleeve 6 and spool member secured to it. A second toothed flange can be provided at this position if preferred. A locking bar 28 extends across between apertures in the side webs 2 and can be moved to engage the teeth of the flange 7 to prevent belt withdrawal, in response to the sensing by a mechanism 32 of belt withdrawal at a predetermined rate and in response to the sensing by a pendulum 34 of a predetermined acceleration of the retractor. These retractor arrangements as such form no part of the present invention and can be widely varied. Locking for example can be in response only to excessive belt or retractor acceleration instead of to both.

The shaft or spindle assembly can be arranged for connection of the belt end thereto in any convenient way, and not only as shown, and the spool member of the invention can be an integral part thereof instead of a separate element.

It is evident that those skilled in the art may make numerous modifications of the specific embodiments described above without departing from the present inventive concepts. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

I claim:

1. A belt reel comprising shaft means having a cross-section of which the radius decreases generally unidirectionally from a maximum to a minimum to define longitudinal step means between positions of maximum and minimum radius, the surface of said shaft means between said positions of maximum and minimum radius consisting solely of a plurality of smoothly merging circular cylindrical surface portions of different radii, and belt means at least approximately in thickness to the radial extent of said step means and secured to said shaft means to extend from said step portion.

2. The belt reel of claim 1 wherein said shaft means is hollow, a slot communicating with the interior of said shaft means is provided at said step means, belt end securement means is provided within said shaft means and said belt means extends outwardly therefrom through said slot.

3. The belt reel of claim 1 wherein said surface portions comprise a first circular cylindrical portion extending from the radially outermost end of said step means, and a second circular cylindrical portion of smaller radius than said first circular cylindrical portion extending from radially innermost end of said step means and merging smoothly with said first circular cylindrical portion along a line defined by the intersection of said shaft means surface by a plane intersecting said step means and the centers of curvature of said first and second portions.

4. A vehicle seat belt retractor comprising:

a frame;

a reel rotatably mounted in said frame and including spindle means;

a belt having an end secured to said spindle means;

spring means acting between said reel and said frame to bias said reel to rotate in a first direction to wind said belt onto said spindle means; and locking means operable in response to a predetermined condition to lock said reel against rotation in the second direction opposite to said first direction;

wherein said spindle means comprises:

a shaft;

a sleeve surrounding said shaft and secured thereto to rotate therewith;

a longitudinal slot in said sleeve;

a pin extending along said slot;

and a spool around said sleeve, said spool having an outer surface formed by a generally radially extending step and by a plurality of part circular cylindrical surface portions merging smoothly together except in the vicinity of said step, and a longitudinally extending slot at the position of said step; and wherein said belt end comprises a loop formed by securing together a doubled over portion of said belt, said doubled over portion being contained within said spool, said loop being received on said pin, and said belt extending around said shaft, outwardly of said sleeve through said longitudinal slot therein, around said sleeve, and outwardly of said spool through said longitudinally extending slot thereof.

5. The retractor of claim 4 further comprising a flange on said reel and means connecting together said flange and said spool against relative rotation.

* * * * *

UNITED STATES PATENT AND TRADEMARK OFFICE
CERTIFICATE OF CORRECTION

PATENT NO. : 4,305,554
DATED : Dec. 15, 1981
INVENTOR(S) : Alexander B. Anderson It is certified that error appears in the above—identified patent and that said Letters Patent is hereby corrected as shown below:

In the heading of the patent insert the following:

--[30]   Foreign Application Priority Data
    Mar. 15, 1979 [GB]  United Kingdom.........7909151--

Signed and Sealed this

Twenty-first Day of December 1982

[SEAL]

Attest:

GERALD J. MOSSINGHOFF

Attesting Officer

Commissioner of Patents and Trademarks